March 24, 1925.

E. F. BEUGLER 1,530,976

MACHINE FOR ROUNDING AND SIZING BARREL HEADS

Filed Nov. 12, 1921 5 Sheets-Sheet 1

Inventor,
Edwin F. Beugler
by Geyer & Popp
Attorneys.

March 24, 1925.
E. F. BEUGLER
1,530,976
MACHINE FOR ROUNDING AND SIZING BARREL HEADS
Filed Nov. 12, 1921     5 Sheets-Sheet 2
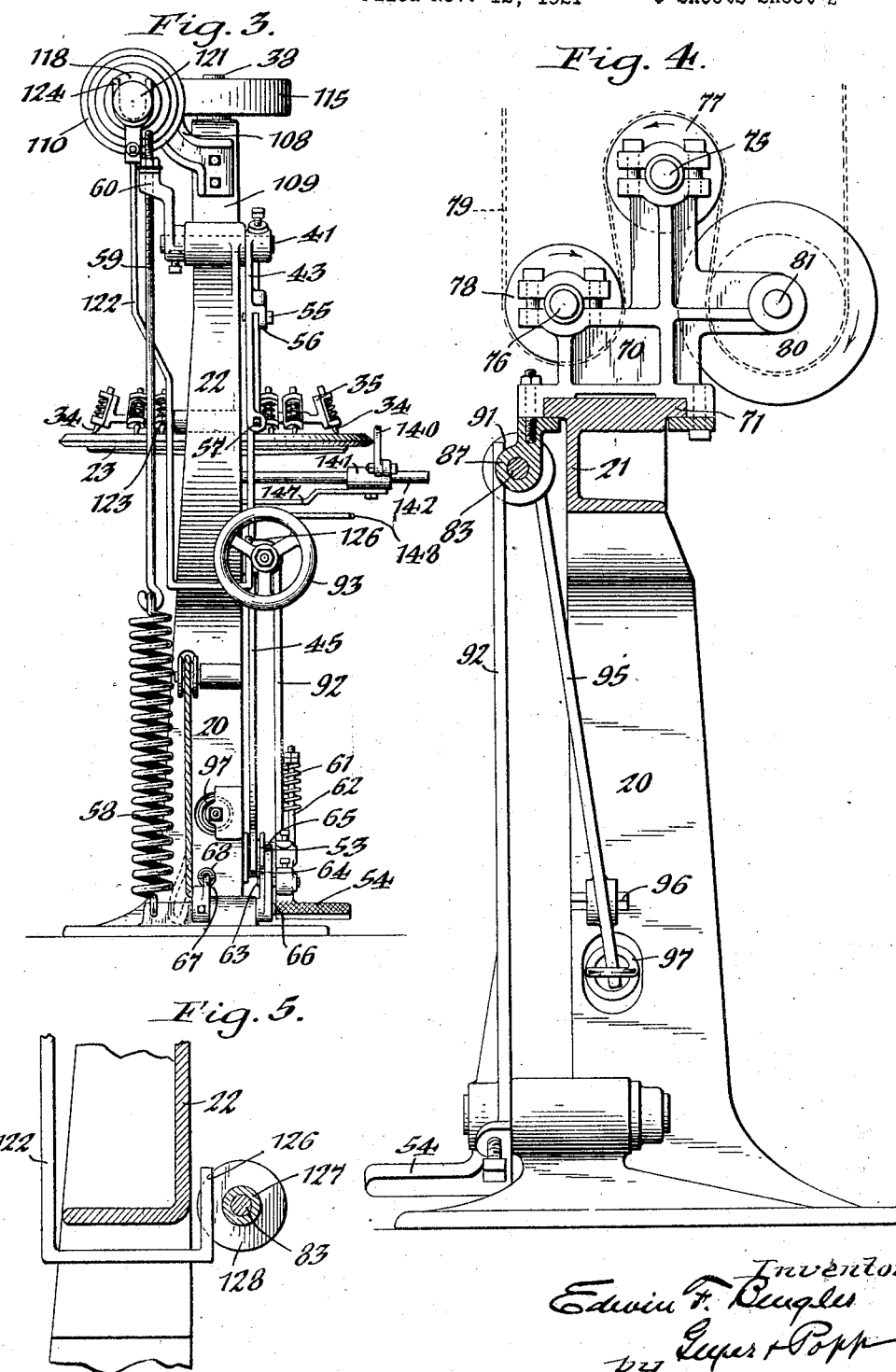

March 24, 1925.  
E. F. BEUGLER  
1,530,976  
MACHINE FOR ROUNDING AND SIZING BARREL HEADS  
Filed Nov. 12, 1921 5 Sheets-Sheet 3

Inventor,  
Edwin F. Beugler  
by Geyer & Popp  
Attorneys.

March 24, 1925.
E. F. BEUGLER
MACHINE FOR ROUNDING AND SIZING BARREL HEADS
Filed Nov. 12, 1921    5 Sheets-Sheet 4
1,530,976
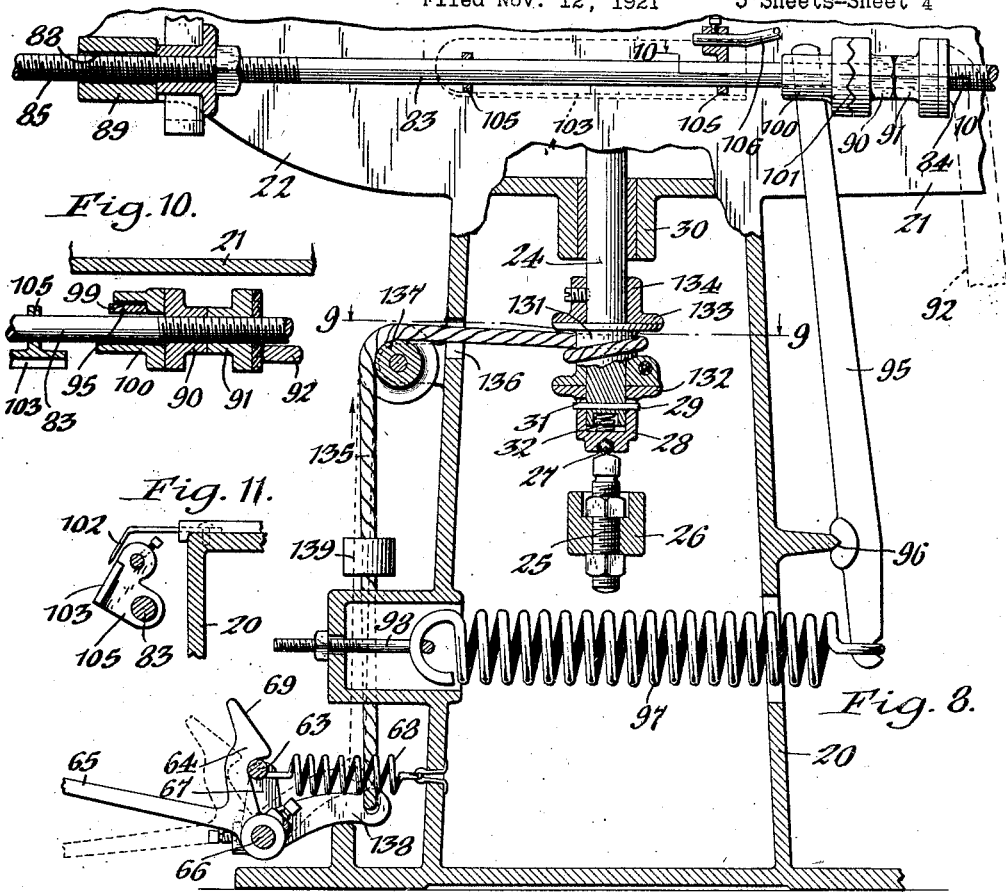
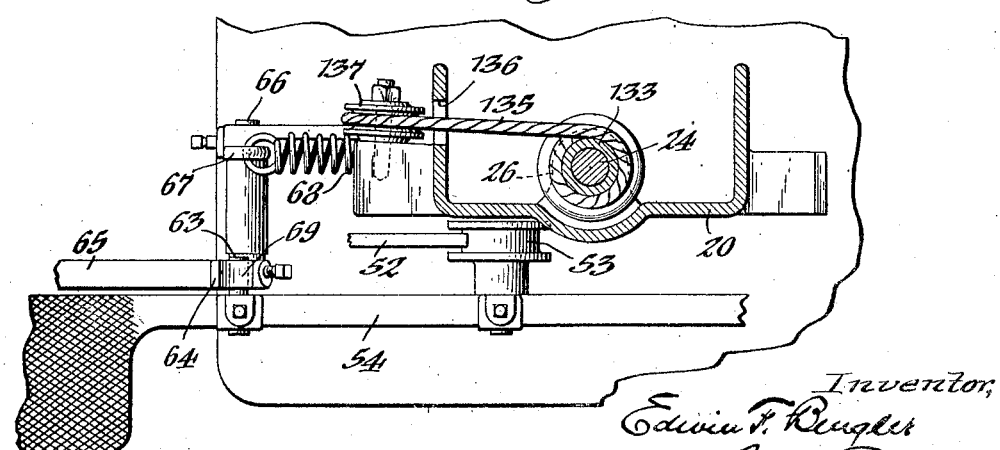

March 24, 1925.  1,530,976
E. F. BEUGLER
MACHINE FOR ROUNDING AND SIZING BARREL HEADS
Filed Nov. 12, 1921   5 Sheets-Sheet 5
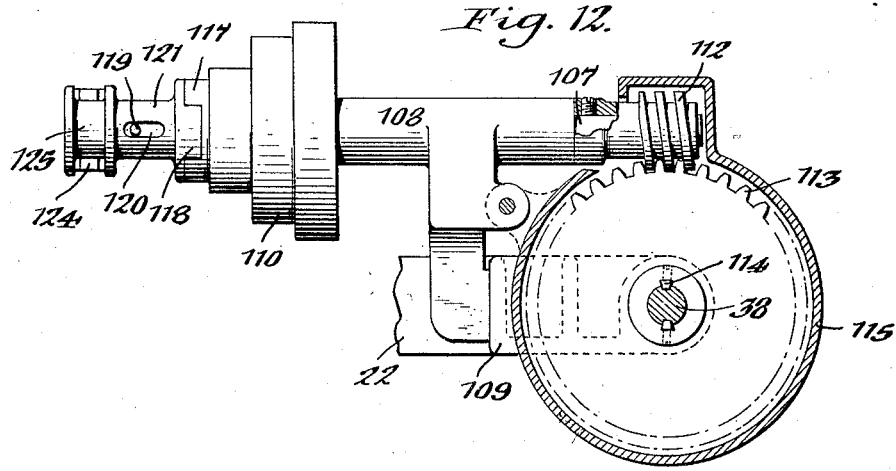
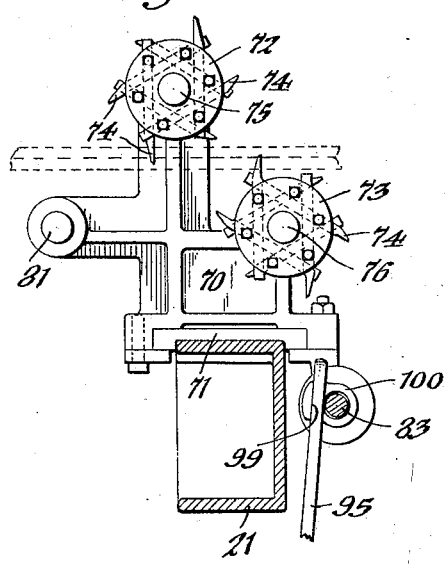
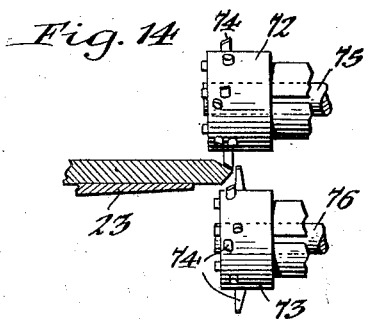
Inventor,
Edwin F. Beugler
by
Attorneys.

Patented Mar. 24, 1925.

1,530,976

UNITED STATES PATENT OFFICE.

EDWIN F. BEUGLER, OF BUFFALO, NEW YORK, ASSIGNOR TO E. & B. HOLMES MACHINERY COMPANY, OF BUFFALO, NEW YORK, A CORPORATION OF NEW YORK.

MACHINE FOR ROUNDING AND SIZING BARREL HEADS.

Application filed November 12, 1921. Serial No. 514,497.

*To all whom it may concern:*

Be it known that I, EDWIN F. BEUGLER, a citizen of the United States, residing at Buffalo, in the county of Erie and State of New York, have invented new and useful Improvements in Machines for Rounding and Sizing Barrel Heads, of which the following is a specification.

This invention relates to a machine for rounding and sizing barrel heads and the like.

The principal object of the invention is to provide a reliable and efficient machine of this character which is adapted to round and shape new heads from square stock as well as resize old heads.

Another object is to provide means for automatically releasing the operating parts of the machine when the work of rounding the head has been performed or completed on it.

A still further object of the invention is to provide a machine which is simple and compact in construction, which is capable of turning out a maximum number of finished heads in a minimum period of time, and which is easily operated and not liable to get out of order.

Figure 1:
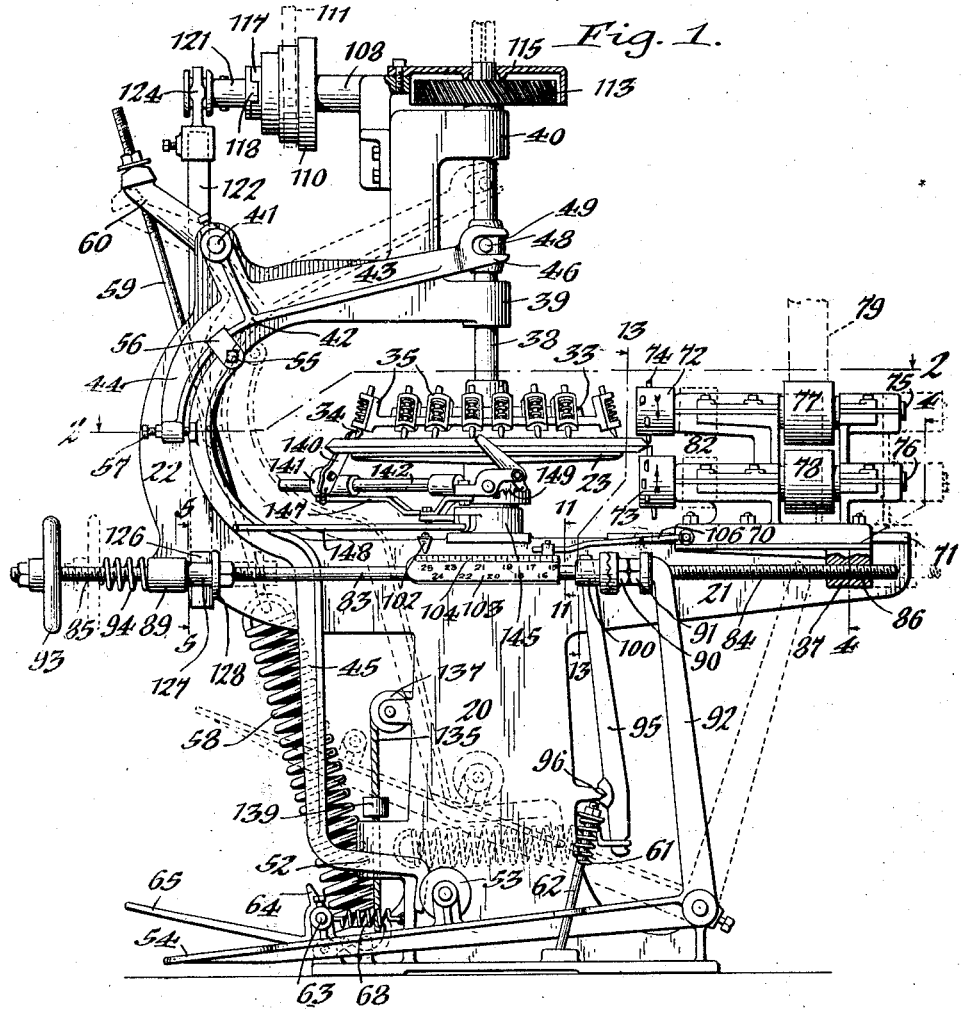
Figure 2:
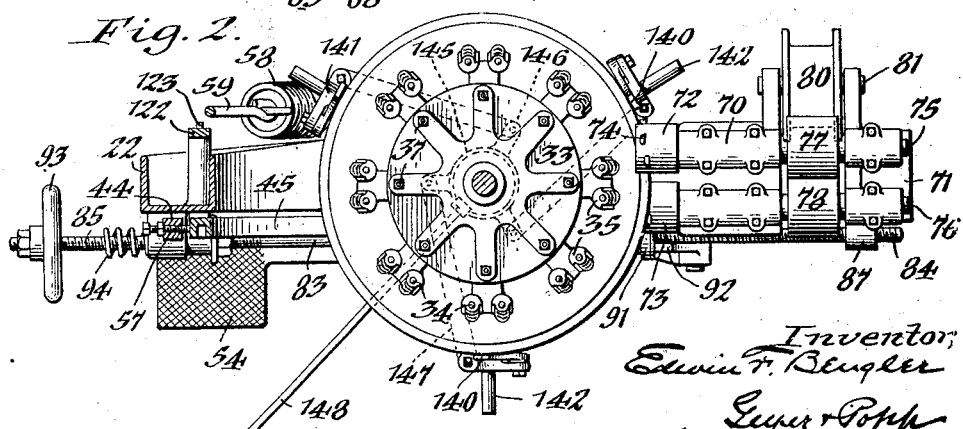
Figure 6:
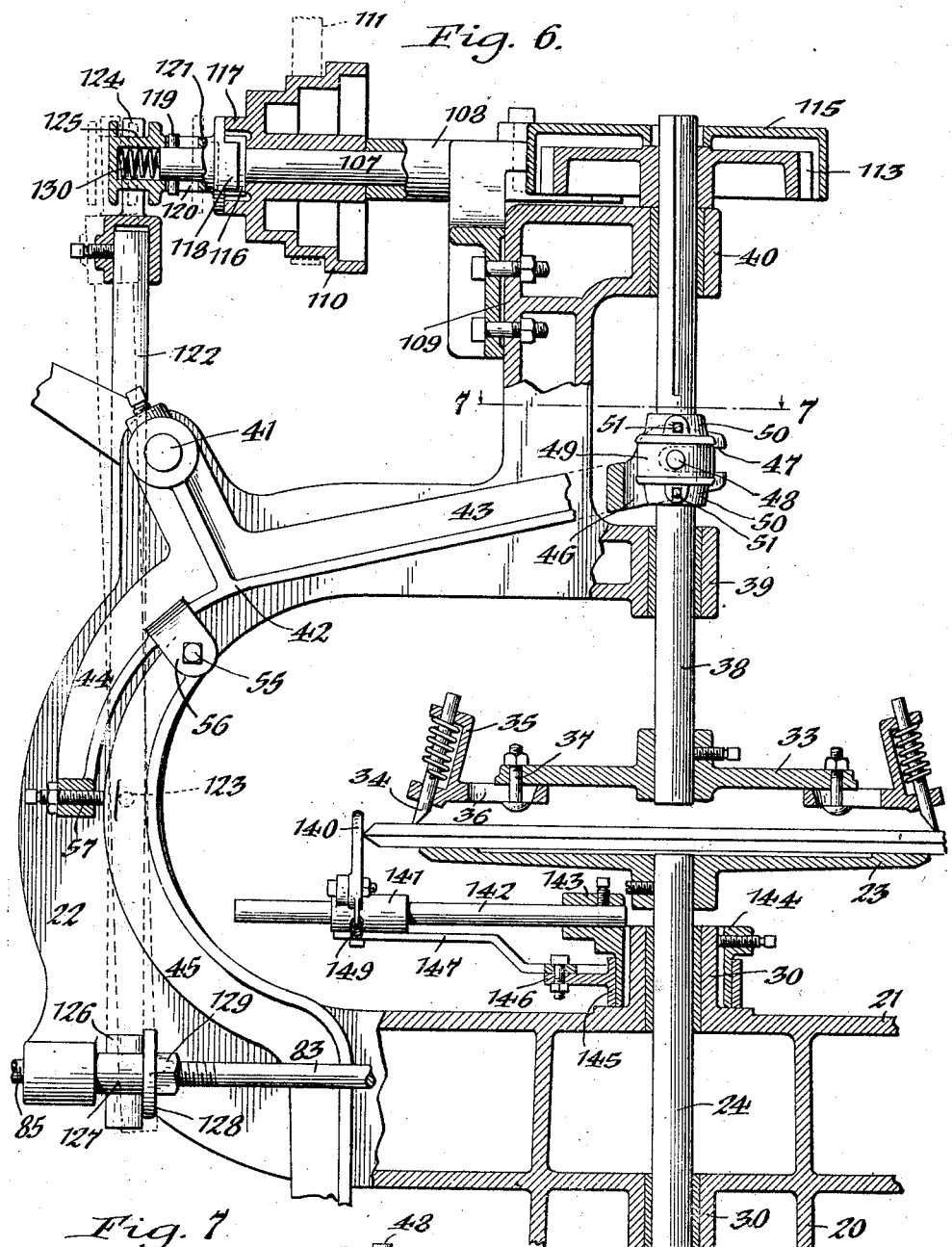
Figure 7:
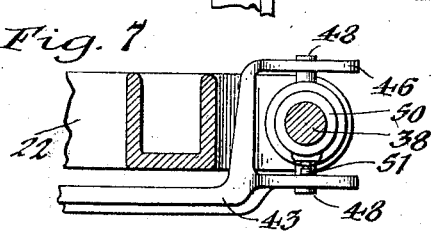

In the accompanying drawings: Figure 1 is a side elevation of the machine, partly in section, showing the parts in their operative positions. Figure 2 is a horizontal section on line 2—2, Fig. 1. Figure 3 is a left hand end view thereof. Figure 4 is an enlarged transverse section on line 4—4, Fig. 1. Figure 5 is an enlarged fragmentary transverse section on line 5—5, Fig. 1. Figure 6 is an enlarged sectional elevation of the upper part of the machine. Figure 7 is a horizontal section on line 7—7, Fig. 6. Figure 8 is an enlarged sectional elevation of the lower part of the machine. Figure 9 is a fragmentary horizontal section on line 9—9, Fig. 8. Figure 10 is a horizontal section on line 10—10, Fig. 8. Figure 11 is an enlarged transverse vertical section on line 11—11, Fig. 1. Figure 12 is a sectional plan view of the driving mechanism for the head clamping device. Figure 13 is an enlarged transverse vertical section on line 13—13, Fig. 1. Figure 14 is an enlarged fragmentary detail view of the cutters in working position relatively to the head. Figure 15 is a sectional elevation of a modified construction for rotating the head clamping device manually.

Similar characters of reference indicate corresponding parts throughout the several views.

The frame for supporting the various working parts of the machine may be of any suitable construction, but as shown in the drawings, the same preferably comprises a base or pedestal 20, an overhanging arm 21 extending from one side thereof, and an overhanging substantially U-shaped arm or goose-neck 22 on the opposite side thereof.

23 indicates a horizontal head supporting plate fixed to the upper end of a freely rotating upright spindle 24 journaled substantially centrally in the pedestal 20. The lower end of this spindle is preferably supported on a step bearing consisting of an adjusting screw 25 mounted on a lug 26 on the rear side of the pedestal and a ball bearing 27 interposed between the head of said adjusting screw and a cap 28 secured to the lower end of the shaft by a pin 29, as shown in Fig. 8. The upper end of the spindle is supported in bearings 30, 30 formed in the upper end of the pedestal of the machine, as shown in Fig. 6. For a purpose which will hereinafter appear, said spindle 24 is permitted a slight vertical movement in its bearings relatively to the cap 28, and to permit such movement the ends of the pin 29 pass through corresponding upright slots 31 in said cap and a cushioning or shock absorbing spring 32 is interposed between the opposing ends of this shaft and its cap.

Movable vertically toward and from the head supporting plate 23 is a rotatable clamping plate or disk 33 provided near its periphery with a plurality of radially-spaced spring-pressed clamping pins 34 whose ends are pointed to grip or bite into the barrel heading being worked, and thereby hold it firmly and tightly on the supporting plate to enable it to revolve with the clamping plate. As shown in Figs. 1, 2, and 6, these pins are preferably arranged in pairs, each pair being mounted in a holder 35 adjustable radially on the clamping disk to suit headings of different diameters. This adjustment may be effected in any well known manner; for example, by providing each holder with a longitudinal slot 36 for receiving the shank of an adjusting bolt 37 secured to the clamping plate. The latter is fixed to the lower end of a driven spindle 38 which is arranged in axial alinement with the spindle 24 of the head supporting plate and which is capable of reciprocating vertically in its bearings 39 and 40 to move the clamping plate 33 toward and from said head supporting plate.

The means for actuating the driven spindle 38 to move the clamping plate 33 toward and from the head supporting plate 23 are preferably constructed as follows:

Mounted on the front end of a transverse rock shaft 41 journalled in the upper side of the goose neck arm 22 is a vertically-swinging actuating lever 42 having an upper arm 43 and a lower sectional arm 44, 45, the former extending inwardly from its fulcrum and the latter extending downwardly therefrom, as shown in Figs. 1 and 6. The free end of the arm 43 is bifurcated, as shown at 46, to embrace the spindle 38. These bifurcated portions are provided with notches or recesses 47 which engage trunnions 48 projecting from the opposite sides of a collar 49 loosely mounted on said spindle 38 and held against vertical displacement thereon by collars 50, 50, arranged on opposite sides of said loose collar and held on the shaft by set screws 51. The section 45 of the lower arm of the lever is provided with an inwardly and downwardly offset portion or dwell 52 with which a grooved anti-friction roller 53 mounted on a vertically movable operating or foot lever 54 engages. The opposing ends of the sectional arms 44, 45, overlap one another in the plane of the lever, and the upper end of the arm section 45 is pivoted at 55 to a lug 56 depending from the upper end of the arm section 44. The lower end of the latter is provided with an adjusting screw 57 which abuts against the opposing outer side of the arm section 45. By thus constructing the lever 42, relative adjustment of the arm sections 44, 45, is permitted, whereby the stroke of the arm 43 may be regulated for the purpose of exerting more or less pressure of the clamping plate 33 on the heading.

The clamping plate and associated parts are held in their elevated inoperative position, shown by dotted lines in Fig. 1, by means of a coil spring 58, its lower end being connected to the base of the pedestal 20 and its upper end being connected to an adjusting rod 59 which is in turn connected to the end of a crank arm 60 mounted on the rear end of the rock shaft 41 and extending outwardly therefrom. This spring tends constantly to rock the arm 60 downwardly and move the arm 43 upwardly to normally hold the clamping plate above the head supporting plate 23 and thereby enable the operator to conveniently assemble the heading in position on said plate. It will be noted, that in this position of the parts, the operating lever 54 assumes the dotted line position shown in Fig. 1, its roller 53 engaging the upper side of the dwell 52 and the spring 58 tending to hold the lever in such position. To cushion the return movement of this operating lever, a buffer spring 61 is provided which is mounted on a substantially upright rod 62 fastened at its lower end to the pedestal base and passing through an elongated opening in the adjacent portion of said lever.

Means are provided for holding or locking the operating lever 54 in its depressed or operative position, shown by full lines in Fig. 1, without necessitating the operator to retain his foot on said lever to hold it in such position. The preferred means for accomplishing this result comprise a locking pin 63 carried by the operating lever and a hook 64 formed on a vertically-swinging release pedal 65 with which said pin is adapted to engage. This pedal is fulcrumed on a transverse shaft 66 supported on the pedestal or base and provided at its rear end with a rock arm 67 which is connected with the pedestal or adjacent fixed part by a coil spring 68 which tends to hold said pedal upwardly so that its hook 64 is constantly in the path of the locking pin 63 of the operating lever. The upper portion of the hook is provided with an upwardly and outwardly inclined face 69 against which said locking pin bears before the hook snaps into locking engagement with its pin. When it is desired to release the operating lever to return the parts connected therewith to their inoperative position, the operator presses downward on the release pedal 65 to release its hook from engagement with the locking pin of said operating lever, whereupon the spring 58 immediately raises the latter to the position shown by dotted lines in Fig. 1.

The cutter mechanism for chamfering or cutting the heading on opposite sides of the peripheral edge thereof is preferably constructed as follows:

70 indicates a cutter supporting carriage or yoke which is movable or slidable horizontally toward and from the head supporting plate 23 in a plane substantially at right angles to the axis of the latter and which is suitably guided for movement on a table 71 formed on the upper side of the pedestal arm 21. 72, 73 represent upper and lower cutter heads having cutters 74 projecting from the peripheries thereof which are adapted to engage opposite sides of the peripheral edge of the work. These heads are mounted on parallel shafts 75, 76 journaled in the carriage and provided with pulleys 77, 78, respectively, around which passes a belt 79 connected to a suitable source of power.

As shown in Fig. 4, the upper cutter head is offset rearwardly above the lower head to prevent interference of the cutters and the belt 79 passes around the lower side of the lower pulley 78, then upwardly around the upper side of the upper pulley 77, and thence downwardly around the lower side of a flanged pulley 80 mounted on a shaft 81 journaled on the rear side of the carriage 70. By this arrangement the cutter heads are driven in opposite directions to cause the chips removed from the heading during the cutting operations to be directed rearwardly away from the operator. As shown in Fig. 1, a space 82 is formed in the carriage between the upper and lower cutter heads for permitting the ready passage of such chips through it onto the floor.

The cutter supporting carriage 70 is moved inwardly into its operative position through the medium of the operating lever 54, the movement of said carriage taking effect after the heading has been clamped between the head plate 23 and the clamping plate 33. In other words, the initial stroke of the operating lever clamps the heading and the final stroke thereof moves the cutter into contact with the heading. For accomplishing this result, the carriage is adjustably connected to a longitudinally movable shipper rod 83 arranged on the front side of the machine and provided at either end with screw threads 84, 85, the threaded portion 84 engaging a correspondingly threaded opening 86 in a lug 87 depending from the lower rear end of said carriage and the threaded portion 85 passing freely through an opening 88 formed in a boss 89 on the front side of the goose neck arm 22 of the frame. Mounted on the threaded portion 84 of this rod is a tappet collar, including a flanged nut 90 and a similar flanged nut 91 jammed against it with which a tappet arm 92, forming an integral part of the operating lever 54, is adapted to engage for shifting said rod and the cutter carriage to its operative position, shown by full lines in Fig. 1. Fixed on the threaded end 85 of the shipper rod is a hand wheel 93 for rotating the latter to adjust the cutter carriage and interposed between the hub of said wheel and the outer face of the boss 89 is a cushioning spring 94. The cutter carriage is moved to its inoperative position, shown by dotted lines in Fig. 1, by means of an upright lever 95 fulcrumed on a knife edge 96 formed on the side of the pedestal 20, the lower arm of the lever being connected to a spring 97 extending through the pedestal and attached at its opposite end to the eye of an adjusting screw 98, while the upper arm of the lever extends into an inwardly opening vertical slot or recess 99 formed on the inner side of a flanged collar 100 loosely mounted on the rod 83. Said spring 97 tends constantly to rock the upper arm of the lever 95 outwardly to shift the cutter carriage to its inoperative position, the upper end of said lever arm abutting against the closed end of the recess 99, as shown in Fig. 10. The outward movement of the cutter carriage is limited by the hub of the hand wheel 93 coming in contact with the cushioning spring 94.

The opposing faces of the flanged portions of the nut 90 and the collar 100 are preferably radially corrugated or knurled as shown at 101, to prevent turning of said nut relatively to the shipper rod 83 when the latter is turned in one direction or the other to effect a corresponding movement of the cutter carriage 70, said collar being held against turning by the upper arm of the lever 95 entering the recess 99 therein. During the rotation of the shipper rod to effect an adjustment of the cutter carriage to suit a barrel head of a certain diameter, said rod is held against longitudinal movement in one direction by the return lever 95 and spring 97 and in the opposite direction by the hand wheel 93 abutting against the cushioning spring 94. Upon turning the hand wheel in one direction or the other the carriage 70 is moved in a corresponding direction toward or from the nut 91 against which the arm 92 of the operating lever abuts. During the turning of the shipper rod, the nuts 90 and 91 turn with it, the collar 100 yielding sufficiently to permit such turning of these nuts relatively to said collar. In this capacity the nuts 90 and 91 act similar to a ratchet, the interlocking corrugations making these nuts self-locking and preventing the rod from turning during the normal operation of the machine.

A suitable gage device is provided for conveniently setting the cutter carriage to shape and resize heading to a certain diameter. As shown in Figs. 1, 8 and 11, this gage device preferably comprises a fixed indicator or pointer 102 overhanging the upper front side of the pedestal 20 and a gage plate 103 movable longitudinally relatively to said indicator and provided along its upper edge with graduations 104 corresponding to the diameters of barrel heading within a certain range. This plate is provided on its rear side with guide ears 105 which are supported on the rod 83 to move relatively thereto, one of said ears being connected with the front end of the cutter carriage by a rigid link 106, so that when the carriage is moved in one direction or the other, the gage plate is moved in a corresponding direction.

The means for driving the rotary spindle 38 of the clamping plate 33 and connecting and disconnecting the same from the source of power are preferably constructed as follows:

107 represents a horizontal driving shaft arranged lengthwise at the upper end of the machine and journaled in a bearing bracket 108 suitably secured to an extension 109 of the arm 22 of the frame. Loosely mounted at one end of this shaft is a cone pulley 110 adapted to be connected by a belt 111 with a source of power, while its other end is provided with a worm gear 112 which meshes with a worm wheel 113 mounted on the upper end of the spindle 38. The latter is compelled to turn with its worm wheel but is capable of sliding vertically through the hub thereof by means of a spline 114. The worm wheel is held against vertical displacement at its upper end by a housing 115 and at its lower end by the upper face of the bearing 40, as shown in Fig. 6. The pulley 110 is held against longitudinal movement on the shaft 107 by its hub abutting at one end against the outer end of the bearing bracket 108 and at its other end against a collar 116 pinned to said shaft. The outer end of the pulley terminates in a jaw clutch member 117 with which a movable jaw clutch member 118 is adapted to engage. This movable clutch member is slidable on the end of the shaft but is compelled to turn therewith, and for this purpose said shaft is provided with a transverse pin 119 whose ends engage longitudinal slots 120 formed in opposite sides of a sleeve 121 formed integrally with said movable clutch member. The means for controlling the latter are preferably operatively connected with the shipper rod 83 to engage the clutch simultaneously with the movement of bringing the cutter carriage 70 into its operative position. To this end a substantially upright vertically-swinging actuating lever 122 is provided which is fulcrumed intermediate its ends on the rear side of the gooseneck arm 22, as shown at 123, the upper arm being provided with a fork 124 which engages a peripheral groove 125 formed in the outer end of the movable clutch sleeve 121. The lower arm of this lever is offset forwardly and upwardly around the lower side of the arm 22 to form a tappet finger 126 on the front side of the machine between said arm and the rod 83. Adjustably mounted on the threaded portion 85 of the latter is a tappet collar 127 having a flange 128 which is arranged in the path of the tappet finger 126. This collar may be held in a set position by a lock nut 129. By this arrangement, when the operating lever 54 is depressed to first lower the clamping plate 33 and secondly, to shift the cutter carriage inwardly so that its cutters contact with the heading to be shaped, the flange of the collar 127 simultaneously with the second-named movement contacts with the tappet 126 of the lever 122, and rocks it from the dotted line position shown in Fig. 6, to the full line position shown in the same figure, in which position the clutch is engaged and motion is transmitted to the spindle 38 to rotate the heading past the cutters.

A spring 130 may be interposed between the end of the shaft 107 and the closed end of the movable clutch member to insure a prompt disengagement of said member when the operating lever is released to return the several parts to their inoperative positions.

Means are provided for automatically releasing the operating lever 54 from its depressed or operative position, as soon as the work of shaping the barrel head has been performed, and thereby disengage the clutch 117, 118, shift the cutter carriage 70 away from the work, and lastly, elevate the clamping plate 33 to enable the finished head to be removed from the supporting table 23. To properly finish a barrel head, the same must revolve at least a revolution and a fraction thereof past the cutters. The means for thus releasing the operating lever are controlled by the rotation of the heading and as shown in Figs. 3, 8 and 9, are preferably constructed as follows:

131 indicates a windlassing spool which is loosely mounted on the head-plate spindle 24 below the lower bearing 30 and which is confined between two friction disks 132, 133, the lower one being formed on the cap 28 of said spindle and the upper one being formed on a collar 134 secured to said spindle. Fastened to this spool is one end of a cable or chain 135 which passes horizontally and outwardly through an opening 136 in the pedestal 20, then around the upper side of a pulley 137 mounted on said pedestal and thence downwardly where its lower end is connected to an arm 138 formed integral with the rock arm 67 which is yieldingly connected with the pedestal by the spring 68 for normally holding the hook 64 in engagement with the locking pin 63 of the operating lever. The cable is provided below the pulley 137 with a counterbalancing weight 139 for normally pulling the cable downward to unwind it from the spool. As previously described, the spindle 24 is capable of a slight vertical movement, this being for the purpose of permitting the upper disk 133 to frictionally engage the spool 131 when the clamping plate is brought down to clamp the heading to the supporting plate 23, and thereby enable the cable to be wound up on the spool and at a predetermined point cause the operating lever to be released from its hook 64. When the cable is completely unwound from the latter, as shown by dotted lines in Fig. 3, there is sufficient slack provided to allow the head clamping device to revolve, say, one and a quarter revolutions, at which time the cable becomes taut and continuing to wind up on the spool, raises the arm 138 which rocks the shaft 66 and releases the hook from engagement with the locking pin in the operating lever, whereupon the latter is elevated to its inoperative position. As soon as the operating lever is released, the clutch is disengaged, stopping the rotation of the clamping device, after which the cutter carriage is withdrawn and the clamping plate 33 raised. As soon as this happens, pressure is removed from the head supporting plate, allowing the spindle to raise to its normal inoperative position under the tension of the spring 32, and releasing the friction disk 133 from engagement with the opposing face of the spool 131, whereupon the counterweight 139 is free to drop by gravity and unwind the cable from the spool.

When reshaping or resizing round barrel heads, means are provided for centering them on the head supporting plate 23. As shown in Figs. 1, 2 and 6, the centering device preferably comprises a series of vertically disposed centering arms 140 mounted on supporting sleeves 141 guided for movement on radial rods 142 securely fastened at their inner ends in bosses 143 formed in a supporting ring or hub 144 held in a fixed position on the upper bearing 30 of the spindle 24. Mounted on this ring to turn thereon is a collar 145 having a series of radial lugs 146 and pivotally connecting the latter with the sleeves are links 147. 148 indicates an operating rod extending forwardly from said collar by means of which the latter is turned in one direction or the other to effect a corresponding inward or outward movement of the centering arms 140. The latter are preferably fulcrumed on said supporting sleeves, as shown in Fig. 1, and their lower ends are connected with the sleeves by springs 149, which maintain them in a normally inclined position with their upper ends projecting above the heading, while they are permitted to yield downwardly below the plane of the heading should they encounter some obstruction on the heading as it is being turned and shaped.

Briefly, the operation of the machine is as follows:

The heading, whether square stock or round heading which is to be resized is placed on the supporting plate 23 and properly centered thereon. The operator then depresses the operating lever 54, the initial movement thereof forcing the clamping plate 33 onto the heading to reliably clamp it to the supporting plate, and then the final stroke thereof simultaneously bringing the cutters 73 into contact with the heading and throwing in the clutch 117, 118 to rotate the spindle 38 to impart rotary motion to the heading relatively to the cutters. After the heading revolves a revolution and a quarter past the cutters, the cable 135 is drawn taut and causes the hook 64 to be released from the locking pin 63, allowing the spring 58 to return the operating lever to its inoperative position, shown by dotted lines in Fig. 1, which movement results in the clutch being disengaged, the cutter carriage being moved away from the heading, and the clamping plate 33 being elevated above the heading, as previously described. The finished head is then removed and the operation repeated.

Should the operator wish to stop the machine before the work on the heading is completed, he simply depresses the pedal 65 with his foot to release the operating lever from the hook 64, which will immediately cause the machine to come to rest.

If desired, the clamping plate 33 may be rotated by hand instead of by power. An arrangement suitable for this purpose is shown in Fig. 15, wherein the power driving mechanism previously described, is removed, and substituted therefor is a hand wheel 150 secured to the upper end of the spindle 38 and provided with a circular ratchet bar 151. Co-operating with this bar is a pawl 152 pivoted to the extension 109 and having a spring 153 for normally holding it in engagement with said bar.

I claim as my invention:

1. A machine of the character described, comprising a frame, a work supporting member rotatable on said frame, a rotary clamping member movable toward and from said supporting member, a cutter mechanism guided on said frame and movable toward and from the peripheral edge of the work on a line perpendicular to the axis of said supporting and clamping members, and an operating lever fulcrumed on said frame and operatively connected to said clamping member and said cutter mechanism to successively move said parts to their operative positions.

2. A machine of the character described, comprising a frame, a work supporting member rotatable on said frame, a rotary clamping member movable toward and from said supporting member, a cutter mechanism guided on said frame and movable toward and from the peripheral edge of the work on a line perpendicular to the axis of said supporting and clamping members, independent connections associated with said clamping member and said cutter mechanism, and means co-operating with said connections for successively moving said clamping member and said cutter mechanism to their operative positions.

3. A machine of the character described, comprising a frame, a work supporting member rotatable on said frame, a rotary clamping member movable toward and from said supporting member, a cutter mechanism guided on said frame and movable toward and from the peripheral edge of the work on a line perpendicular to the axis of said supporting and clamping members, a vertically-swinging actuating lever fulcrumed on said frame and connected to said clamping member, a shipper rod guided on said frame and connected to said cutter mechanism, and means co-operating with said actuating lever and said shipper rod for moving said clamping member and said cutter mechanism to their operative positions.

4. A machine of the character described, comprising a frame, a work supporting member rotatable on said frame, a rotary clamping member movable toward and from said supporting member, a cutter mechanism guided on said frame and movable toward and from the peripheral edge of the work on a line perpendicular to the axis of said supporting and clamping members, a vertically-swinging actuating lever fulcrumed on said frame and connected to said clamping member, a shipper rod guided on said frame and connected to said cutter mechanism, and an operating lever fulcrumed on said frame and adapted for engagement with said actuating lever and said shipper rod for moving said clamping member and said cutter mechanism to their operative positions.

5. A machine of the character described, comprising a frame, a work supporting member rotatable on said frame, a rotary clamping member movable toward and from said supporting member, a cutter mechanism guided on said frame and movable toward and from the peripheral edge of the work on a line perpendicular to the axis of said supporting and clamping members, a vertically-swinging actuating lever fulcrumed on said frame and connected to said clamping member, a shipper rod guided on said frame and connected to said cutter mechanism, and an operating lever fulcrumed on said frame, one arm of said operating lever being adapted for engagement with the actuating lever of said clamping member and the other arm thereof being adapted for engagement with the shipper rod of said cutter mechanism.

6. A machine of the character described, comprising a frame, a work supporting member rotatable on said frame, a rotary clamping member movable toward and from said supporting member, a cutter mechanism guided on said frame and movable toward and from the peripheral edge of the work on a line perpendicular to the axis of said supporting and clamping members, a vertically-swinging actuating lever fulcrumed on said frame and connected to said clamping member, a shipper rod guided on said frame and connected to said cutter mechanism, an operating lever fulcrumed on said frame and arranged to engage with said actuating lever and said shipper rod for moving said clamping member and said cutter mechanism to their operative positions, and automatic means for returning said parts to their inoperative positions when said operating lever is released.

7. A machine of the character described, comprising a frame, a work supporting member rotatable on said frame, a rotary clamping member movable toward and from said supporting member, a cutter mechanism guided on said frame and movable toward and from the peripheral edge of the work on a line perpendicular to the axis of said supporting and clamping members, independent connections associated with said clamping member and said cutter mechanism, and means co-operating with said connections for successively moving said clamping member and said cutter mechanism to their operative positions, and means for returning said parts to their inoperative positions when said first-named means is released.

8. A machine of the character described, comprising a frame, a work supporting member rotatable on said frame, a rotary clamping member movable toward and from said supporting member, a cutter mechanism guided on said frame and movable toward and from the peripheral edge of the work on a line perpendicular to the axis of said supporting and clamping members, a vertically-swinging actuating lever fulcrumed on said frame and connected to said clamping member, a shipper rod guided on said frame and connected to said cutter mechanism, independent means for restraining movement of said clamping member and said cutter mechanism out of their normal inoperative positions, and an operating lever fulcrumed on said frame and arranged to engage with said actuating lever and said shipper rod for moving said clamping member and said cutter mechanism to their operative positions.

9. A machine of the character described, comprising a frame, a work supporting member rotatable on said frame, a rotary clamping member movable toward and from said supporting member, a vertically-swinging actuating lever fulcrumed on said frame having one arm thereof connected to said clamping member, the other arm being composed of adjustable sections arranged at an angle to said first-named arm, a cutter mechanism guided on said frame and movable toward and from the peripheral edge of the work, and an operating lever fulcrumed on said frame and adapted for engagement with the sectional arm of said actuating lever to move the clamping member to its operative position, said operating lever being also operatively connected to said cutter mechanism to move it to operative position.

10. A machine of the character described, comprising a frame, a work supporting member rotatable on said frame, a rotary clamping member movable toward and from said supporting member, a vertically-swinging actuating lever fulcrumed on said frame having one arm thereof connected to said clamping member, the other arm being arranged at an angle to said first-named arm and provided at its lower end with a dwell, means for restraining movement of said lever out of its normal inoperative position to hold said clamping member in such position, and an operating lever fulcrumed on said frame for moving said clamping member and said cutter mechanism to their operative positions, a part of said lever engaging with the dwell of said actuating lever.

11. A machine of the character described, comprising a frame, a work supporting member rotatable on said frame, a rotary clamping member movable toward and from said supporting member, a vertically-swinging actuating lever fulcrumed on said frame having an upper arm operatively connected to said clamping member and a lower arm composed of upper and lower sections, the lower section being pivoted to said upper section and adjustable relatively thereto and provided at its lower end with a dwell, a cutter mechanism guided on said frame and movable toward and from the peripheral edge of the work, a shipper rod guided on said frame and connected to said cutter mechanism, means for restraining movement of said actuating lever and said rod out of their normal inoperative positions, and an operating lever fulcrumed on said frame and adapted for engagement with the dwell of said actuating lever and said shipper rod for moving the parts connected therewith to their operative positions.

12. A machine of the character described, comprising a frame, rotatable means for supporting and clamping a piece of work, an adjustable cutter carriage guided on said frame and movable toward and from the peripheral edge of the work, a shipper rod guided on said frame and having threaded engagement with said cutter carriage, means for rotating said rod to effect an adjustment of said carriage toward and from the work, means for restraining movement of said cutter carriage out of its normal inoperative position including a return spring and lever, and a collar on said rod against which the upper end of said lever bears and which is held against turning by said lever, and means for shifting said rod to move the cutter carriage to its operative position including a tappet collar adjustable lengthwise by turning and engaged to keep it from turning by said first mentioned collar.

13. A machine of the character described, comprising a frame, rotatable means for supporting the work, cutter mechanism guided on said frame and movable toward and from the peripheral edge of the work, a shipper rod guided on said frame and having screw threads at one end operatively connected to said cutter mechanism, a tappet device including two lock nuts arranged on the threaded end of said rod to turn therewith, means for restraining movement of said cutter mechanism out of its normal inoperative position, including a collar loosely mounted on said rod and frictionally interlocking with said tappet device, and a yieldable lever co-operating with said collar to hold it in interlocking engagement with said tappet device and to hold it against turning on said rod, and an operating lever having a tappet arm adapted for engagement with said tappet device.

14. A machine of the character described, comprising a frame, a work supporting member rotatable on said frame, a rotary clamping member movable toward and from said supporting member, a cutter mechanism guided on said frame and movable toward and from the peripheral edge of the work, a vertically-swinging actuating lever fulcrumed on said frame and connected to said clamping member, a shipper rod guided on said frame and connected to said cutter mechanism, means co-operating with said shipper rod for controlling the rotation of said clamping member, and an operating lever fulcrumed on said frame and adapted for engagement with said actuating lever and said shipper rod for moving the parts associated therewith to their operative positions.

15. A machine of the character described, comprising a frame, a work supporting member rotatable on said frame, a rotary clamping member movable toward and from said supporting member, a cutter mechanism guided on said frame and movable toward and from the peripheral edge of the work, a vertically-swinging actuating lever fulcrumed on said frame and connected to said clamping member, a shipper rod guided on said frame and connected to said cutter mechanism, means co-operating with said shipper rod for controlling the rotation of said clamping member, an operating lever fulcrumed on said frame and adapted for engagement with said actuating lever and said shipper rod for moving the parts associated therewith to their operative positions, and means for returning said parts to their inoperative positions when said operating lever is released.

16. A machine of the character described, comprising a frame, a work supporting member rotatable on said frame, a rotary clamping member movable toward and from said supporting plate, power-driven means for rotating said clamping member, a clutch associated with said means, a cutter mechanism movable toward and from the peripheral edge of the work, a vertically-swinging actuating lever fulcrumed on said frame and connected to said clamping member, a longitudinally-movable shipper rod guided on said frame and connected to said cutter mechanism, a lever for operating said clutch and controlled by the movement of said shipper rod, and an operating lever fulcrumed on said frame and adapted for engagement with the actuating lever of said clamping member and with said shipper rod.

17. A machine of the character described, comprising a frame, a work supporting member rotatable on said frame, a rotary clamping member movable toward and from said supporting plate, power-driven means for rotating said clamping member, a clutch associated with said means, a cutter mechanism movable toward and from the peripheral edge of the work on a line perpendicular to the axis of said supporting members, a vertically-swinging actuating lever fulcrumed on said frame and connected to said clamping member, a longitudinally movable shipper rod connected to said cutter mechanism and provided with two tappet collars, a lever for operating said clutch and having a tappet finger arranged in the path of movement of one of said tappet collars, an operating lever fulcrumed on said frame having one of its arms adapted for engagement with the actuating lever of said clamping member and its other arm adapted for engagement with the other of said tappet collars, and means for restraining the movement of said parts out of their normal inoperative positions.

18. A machine of the character described, comprising a frame, a spindle journaled in said frame, a work supporting member mounted on said spindle, a rotary clamping member movable toward and from said supporting member, means for rotating said clamping member, a cutter mechanism movable toward and from the peripheral edge of the work on a line perpendicular to the axis of said supporting members, an operating lever for moving said clamping member and said cutter mechanism to their operative positions, means for restraining movement of the clamping member, the cutter mechanism and the operating lever out of their normal inoperative positions, a releasable locking device for holding said operating lever in its operative position, and automatic means for releasing said locking device including a windlassing spool loosely arranged on the spindle of said supporting member, means on said spindle for frictionally engaging said spool to compel the latter to rotate therewith during the operation of the machine, and a cable attached at one end to said spool and at its other end to said releasable locking device.

19. A machine of the character described, comprising a frame, a spindle journaled in said frame and capable of a yielding movement in the direction of its axis, a work supporting member mounted on said spindle, a rotary clamping member movable toward and from said supporting member, means for rotating said clamping member, a cutter mechanism movable toward and from the peripheral edge of the work on a line perpendicular to the axis of said supporting members, an operating lever for moving said clamping member and said cutter mechanism to their operative positions, means for restraining movement of the clamping member, the cutter mechanism and the operating lever out of their normal inoperative positions, a releasable locking device for holding said operating lever in its operative positions, and automatic means for releasing said locking device including a windlassing spool loosely arranged on the spindle of said supporting member, friction disks mounted on said spindle above and below said spool to contact with the opposing surfaces thereof, one of said friction disks being slidable on said spindle, and a cable attached at one end to said spool and at its other end to said releasable locking device.

20. A machine of the character described, comprising a work supporting table, and means for centering the work on the table including radially movable centering arms, said arms being circumferentially yieldable to swing below the plane of the work.

21. A machine of the character described, comprising a work supporting table, and means for centering the work on the table comprising radially disposed guide rods, supporting sleeves movable lengthwise on said rods, and circumferentially yieldable centering arms pivotally mounted on said sleeves, said arms normally extending above the plane of the work.

EDWIN F. BEUGLER.